United States Patent
Portenlanger et al.

(10) Patent No.: US 9,618,124 B2
(45) Date of Patent: Apr. 11, 2017

(54) COOLED MECHANICAL SEAL ASSEMBLY

(75) Inventors: Joseph Portenlanger, Endlhausen (DE); Michael Dorig, Munich (DE)

(73) Assignee: EagleBurgmann Germany GmbH & Co. KG, Wolfratshausen (DE)

(*) Notice: Subject to any disclaimer, the term of this patent is extended or adjusted under 35 U.S.C. 154(b) by 92 days.

(21) Appl. No.: 14/238,028

(22) PCT Filed: Aug. 2, 2012

(86) PCT No.: PCT/EP2012/003301
§ 371 (c)(1),
(2), (4) Date: Feb. 10, 2014

(87) PCT Pub. No.: WO2013/026526
PCT Pub. Date: Feb. 28, 2013

(65) Prior Publication Data
US 2014/0175747 A1    Jun. 26, 2014

(30) Foreign Application Priority Data

Aug. 24, 2011  (DE) .................. 10 2011 111 697

(51) Int. Cl.
*F16J 15/34*    (2006.01)

(52) U.S. Cl.
CPC ........... *F16J 15/34* (2013.01); *F16J 15/3404* (2013.01)

(58) Field of Classification Search
CPC ........ F16J 15/3412; F16J 15/54; F16J 15/162; F16J 15/34; F16J 15/3404; F04D 29/12
See application file for complete search history.

(56) References Cited

U.S. PATENT DOCUMENTS 4,377,290 A * 3/1983 Netzel ................. F16J 15/3484
                                                          277/368
4,407,512 A * 10/1983 Trytek ................ F16J 15/3412
                                                          277/390

(Continued)

FOREIGN PATENT DOCUMENTS

| DE | 9105482 U1 | 7/1991 |
|---|---|---|
| DE | 10223639 A1 | 12/2003 |
| JP | 2009108941 A | 5/2009 |

OTHER PUBLICATIONS

International Search Report for related PCT Application No. PCT/EP2012/003301 issued Oct. 31, 2012.

*Primary Examiner* — Kristina Fulton
*Assistant Examiner* — Eugene G Byrd
(74) *Attorney, Agent, or Firm* — Locke Lord LLP; Scott D. Wofsy; Alicia J. Carroll (57) ABSTRACT

The present invention relates to a mechanical seal assembly, comprising: a rotating seal ring (2) and a stationary seal ring (3), which define a sealing gap (4) therebetween, a shaft bush (6), on which the rotating seal ring (2) is arranged, a carrier ring (5), which is arranged on the shaft bush (6) and at least partly covers the rotating seal ring (2) on the outer circumference thereof, a first O-ring (8) and a second O-ring (9), which are arranged between the rotating seal ring (2) and the carrier ring (5) and define an interspace (15) on the outer circumference of the rotating seal ring (2) between the carrier ring (5) and the rotating seal ring (2), and at least one connecting opening (11), which connects the interspace (15) to an outer circumferential surface of the carrier ring (5).

12 Claims, 6 Drawing Sheets

(56) References Cited

U.S. PATENT DOCUMENTS

| | | | | |
|---|---|---|---|---|
| 4,466,619 A * | 8/1984 | Adams | ................... | F16J 15/162 |
| | | | | 277/367 |
| 4,560,173 A * | 12/1985 | Adams | ................... | F16J 15/162 |
| | | | | 277/367 |
| 5,066,026 A * | 11/1991 | Heck | ................... | F16J 15/3484 |
| | | | | 277/400 |
| 5,249,812 A * | 10/1993 | Volden | ................... | F16J 15/162 |
| | | | | 277/361 |
| 5,713,576 A * | 2/1998 | Wasser | ................. | F16J 15/3404 |
| | | | | 277/304 |
| 6,142,478 A * | 11/2000 | Pecht | ................... | F16J 15/3484 |
| | | | | 277/400 |
| 6,213,473 B1 * | 4/2001 | Lebeck | ................. | F16J 15/342 |
| | | | | 277/387 |
| 6,416,057 B1 * | 7/2002 | Adams | ................ | F16J 15/3288 |
| | | | | 277/352 |
| 2005/0263963 A1 * | 12/2005 | Lai | ...................... | F16J 15/3412 |
| | | | | 277/399 |
| 2007/0296156 A1 * | 12/2007 | Yanagisawa | ......... | F16J 15/3412 |
| | | | | 277/352 |
| 2009/0140494 A1 * | 6/2009 | Roddis | ................. | F04D 29/106 |
| | | | | 277/408 |
| 2012/0099984 A1 * | 4/2012 | Abarca Melo | ........ | F04D 29/126 |
| | | | | 415/229 |
| 2013/0168928 A1 * | 7/2013 | Schrufer | ............. | C10M 103/02 |
| | | | | 277/500 |

\* cited by examiner

COOLED MECHANICAL SEAL ASSEMBLY

DESCRIPTION

The present invention relates to a fluid-cooled mechanical seal assembly, which is particularly configured as a dry-running mechanical seal, and to a method for optimizing a heat transport of the mechanical seal assembly.

Mechanical seal assemblies are known from the prior art in different configurations. For instance gas-lubricated mechanical seals are used in agitators; in this case a gas, particularly air, is present between a rotating seal ring and a stationary seal ring as a so-called dry-running seal. Such mechanical seal assemblies can be operated in a contacting condition and also with a sealing gap. During operation heat problems may arise and undesired noise may be generated in such mechanical seals. JP 2009-108941 A1 discloses a mechanical seal in which in a rotating seal ring a gas passage channel is formed, which is guided up to the slide surfaces on the sealing gap through the seal ring. This solution, however, requires radial and axial bores and milled-out portions in the seal ring itself and is thus very complex and expensive. Furthermore, the seal rings are weakened due to the channels, which particularly in dependence upon a pressure to be sealed off may lead to distortions on the seal rings and to a shorter service life of the seal rings in the end.

It is therefore the object of the present invention to provide a mechanical seal assembly which while being of a simple structure and inexpensive in its production provides an improved cooling by means of a fluid, particularly gas, and especially an energy-saving and space-optimized cooling.

This object is achieved by a mechanical seal assembly with the features of claim 1. The sub-claims show preferred developments of the invention.

The mechanical seal assembly of the invention with the features of claim 1 has a significantly improved service life in comparison with the prior art. Furthermore, a more effective cooling of the seal rings is made possible. Furthermore, the mechanical seal assembly according to the invention can effectively prevent an undesired pressure buildup between a rotating seal ring and a carrier ring. Moreover, the cooling operation does not require any additional installation space. This is accomplished according to the invention in that in a carrier ring fastened to a shaft bush at least one connecting opening to an interspace is present between the rotating seal ring and the carrier ring. The interspace is formed in a ring shape by two O-rings, which are arranged between the inside of the carrier ring and the outside of the rotating seal ring. The connecting opening in the carrier ring enables an inflow and outflow, particularly aeration and de-aeration, of the interspace and thereby an effective cooling of the rotating seal ring. Furthermore, an undesired pressure rise is not possible in the interspace because the interspace is connected via the connecting opening to the outer circumferential surface of the carrier ring (atmosphere side). Due to the rotation of the carrier ring together with the rotating seal ring, a fluid circulation is generated via the connecting opening on the radial outer circumferential surface of the rotating seal ring, so that the ring can be effectively cooled. Hence, heat can be discharged via the developing fluid stream. A further special advantage of the solution according to the invention is that the heat development on the seal rings substantially depends on the rotational speed. Since the cooling power is however also increasing with the rotational speed, a rotational speed-dependent cooling of the mechanical seal assembly can be enabled automatically.

Preferably, the carrier ring comprises multiple connecting openings. These are particularly preferably arranged equally distributed on the circumference. The cooling power can thereby be improved effectively by the rotating carrier ring. The shape of the connecting openings is here preferably configured to be cylindrical with identical or different diameters and/or tapering, particularly conically tapering, and/or stepped (stepped bores) and/or in the form of elongated holes. Particularly preferably, the connecting openings are here arranged on a circular circumferential line on the carrier ring. Alternatively, the connecting openings are provided in different planes on the carrier ring.

A particularly effective cooling is achieved when preferably a central axis of the connecting openings is arranged at an angle of less than 90° relative to a tangent T on an outer circumference of the carrier ring. The angle is preferably in a range of from 45° to 65° and is particularly preferably about 55° relative to the tangent on the carrier ring. Alternatively, the connecting openings are arranged at an angle between 90° and 170°. Further preferably, all of the connecting openings at an identical angle are also oriented in an identical direction, resulting in a preferred rotation direction.

Particularly preferably, two mutually neighboring connecting openings are each arranged such that central axes of the neighboring connecting openings define an angle of about 90°. This can yield an effective cooling which is independent of the rotation direction because both for an anticlockwise direction and for a clockwise direction respective connecting openings are provided at an angle opposite to the running direction. This particularly permits a use of the mechanical seal assembly in agitators where a counter-clockwise rotation and a clockwise rotation may take place. Further preferably, mutually neighboring connecting openings intersect one another on an inner circumference of the carrier ring. A particularly efficient flow guidance in the interspace between the carrier ring and the rotating seal ring is thereby made possible.

Further preferably, the carrier ring comprises a groove which is provided on an outer circumferential surface of the carrier ring and connects the connecting openings to one another. A gas stream is thereby guided on the outside of the carrier ring. The groove is preferably V-shaped, particularly with an angle of about 90°. Alternatively, the groove is provided as a continuous groove in a plane of the carrier ring. Alternatively, the groove connects connecting openings in different planes of the carrier ring in zig-zag form.

For a particularly compact structure the carrier ring further preferably comprises fastening openings for accommodating fastening elements with which the carrier ring is fixed to the shaft bush.

Particularly preferably, the mechanical seal assembly further comprises a clamping ring which is radially arranged inside the shaft bush. The clamping ring is preferably fixed by the fastening elements, which are passed through the fastening openings in the carrier ring, to a rotating component, such as a shaft.

Furthermore, the mechanical seal assembly according to the invention further preferably comprises a biasing means which is arranged on the rotating seal ring and biases the rotating seal ring relative to the stationary seal ring. This ensures a minimal sealing gap between the two seal rings. Alternatively, a projection may also be provided in a mutually contacting condition of the seal rings by the biasing means.

To achieve a particularly compact and simple assembly, preferably the carrier ring in an axial direction of the mechanical seal assembly is longer than the shaft bush. Further preferably, the seal rings, the shaft bush, the carrier ring and the two O-rings form a subassembly which can be preassembled. This enables on the one hand a fast mounting of the mechanical seal assembly, with the stationary seal ring being particularly preferably arranged on a flange, or the like.

Further preferably, the carrier ring has a structure which is symmetrical relative to a plane extending through a central axis. The carrier ring can thereby particularly be mounted in a faultless way.

A liquid or a gas, particularly air, or a gas/liquid mixture can be used as the medium for cooling.

The mechanical seal assembly according to the invention is particularly preferably used in agitators, or the like.

Furthermore, the invention refers to an agitator with a mechanical seal assembly according to the invention.

Furthermore, the present invention relates to a method for optimizing a heat transport and/or a waviness of a rotating part, particularly a rotating seal ring, of a mechanical seal. The rotating part is thermally chambered by means of a sleeve-like element, wherein the sleeve-like element is co-rotating with the rotating part. A fluid provided between the rotating part and the sleeve-like element is here moved to carry out the heat transport and to optimize waviness, especially on the sealing gap between the seal rings. Hence, heat can be supplied and/or discharged to/from the rotating part of the mechanical seal assembly in a selective way, so that particularly an undesired waviness of the seal rings can be avoided. Particularly preferably, the fluid is exclusively moved by the rotation process. Particularly the provision of separately driven components for moving the fluid can thereby be dispensed with. Particularly preferably, the heat transport can be influenced in a selective manner by varying the flow path for the fluid. Particularly preferably, the heat transport is here carried out through openings and/or slots in the sleeve-like component. The heat transport can selectively be varied on the rotating part of the mechanical seal particularly through the selection of the geometrical shape of the openings/slots. Particularly, a waviness of the seal rings can thereby also be adjusted in a selective manner.

An embodiment of a mechanical seal assembly according to the invention will now be described in detail with reference to the accompanying drawing, in which.

As can be seen from FIGS. 1 to 6, the mechanical seal assembly 1 according to the first embodiment of the present invention comprises a rotating seal ring 2 and a stationary seal ring 3 which define a sealing gap 4 thereinbetween. The rotating seal ring 2 is rotating in this embodiment with a shaft 17 as the rotating component. The rotating seal ring 2 is arranged on a shaft bush 6 which is slid over a clamping ring 7. Furthermore, a carrier ring 6 is provided, which comprises a plurality of elongated holes 5a provided as continuous openings, each accommodating a fastening element 10. With the help of the fastening elements 10 the shaft bush 6 is fixed onto the clamping ring 7, and the clamping ring is clamped onto the shaft 17. Thus the clamping ring 7, the shaft bush 6, the rotating seal ring 2 and the carrier ring 5 are co-rotating with one another. Furthermore, in recesses in the shaft bush 6, biasing means 16 which are equally distributed along the circumference are provided for biasing the rotating seal ring 2 relative to the stationary seal ring 3.

The stationary seal ring 3 is surrounded and held by a retaining ring 13, the retaining ring 13 being fixed by means of headless screws 18 or another positive connection in a flange 14.

Furthermore, an annular interspace 15 is provided on an outer circumferential surface 2 of the rotating seal ring 2, which is radial to a central axis X-X, and on an inner circumferential surface 5b of the carrier ring 5. The annular interspace 15 is defined by a first O-ring 8 and a second O-ring 9 between the carrier ring 5 and the rotating seal ring 2. The first O-ring 8 and the second O-ring 9 are here arranged in radial direction relative to the central axis X-X between the rotating seal ring 2 and the carrier ring 5. Respective recesses for the first and second O-ring 8, 9 may here be provided in the rotating seal ring 2 and/or in the carrier ring 5. Furthermore, multiple connecting openings 11 are formed in the carrier ring 5. The connecting openings 11 can be seen in detail in FIGS. 4 and 5. The connecting openings 11 are here connecting the interspace 15 to an outer circumferential surface 5c on the carrier ring 5.

Figure 1:
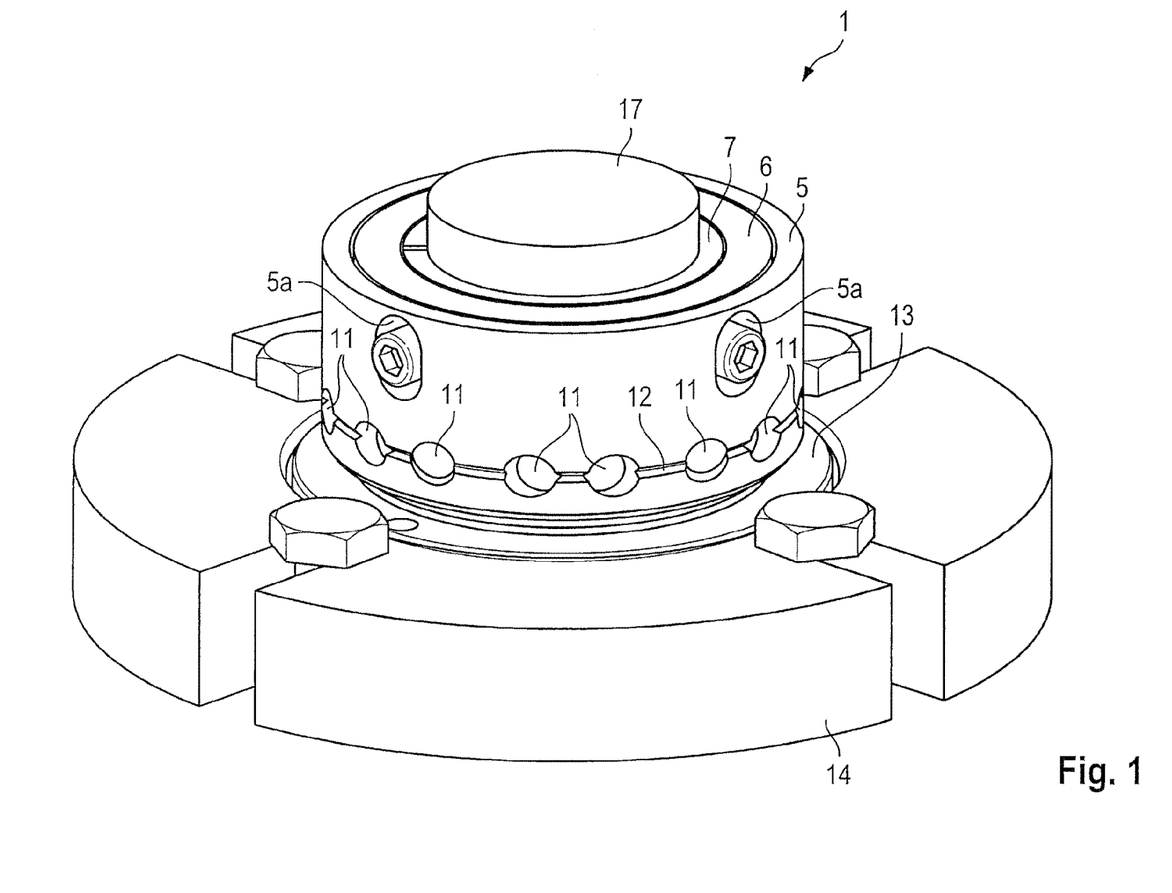
FIG. 1 is a schematic perspective view of a mechanical seal assembly according to a first embodiment of the invention.
Figure 2:
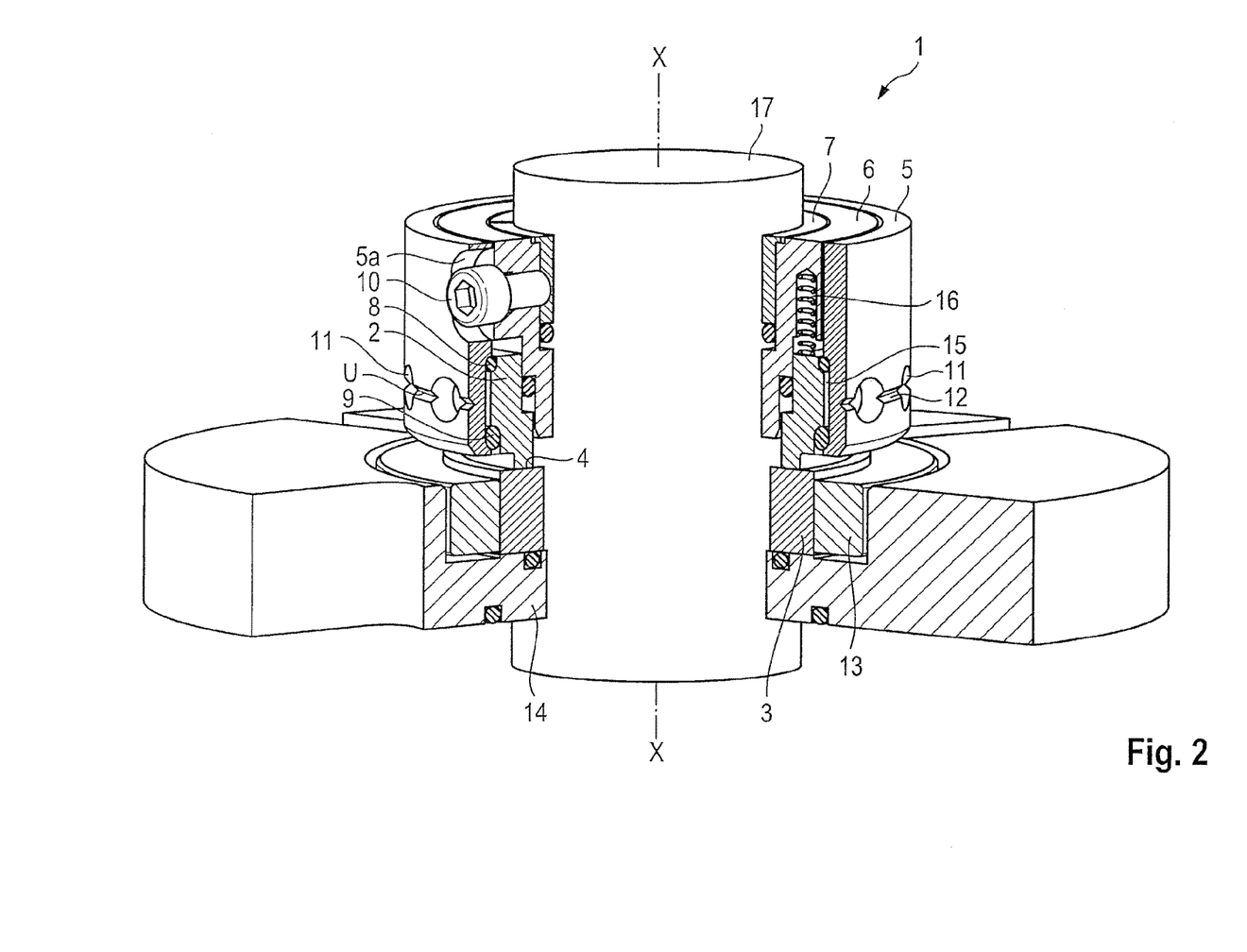
FIG. 2 is a schematic, partly cut view of FIG. 1.
Figure 3:
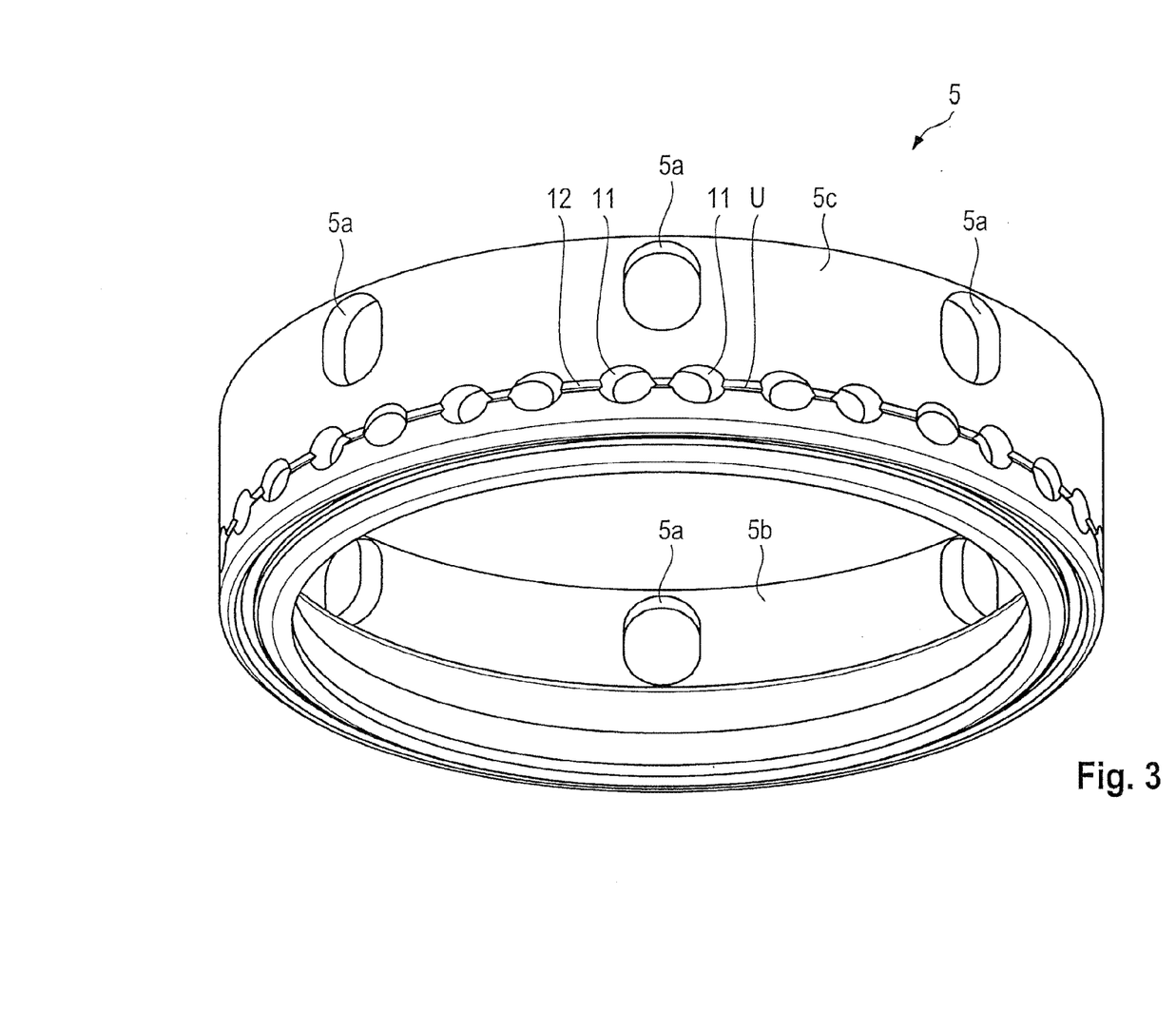
FIG. 3 is a perspective view of a carrier ring of FIG. 1.
Figure 4:
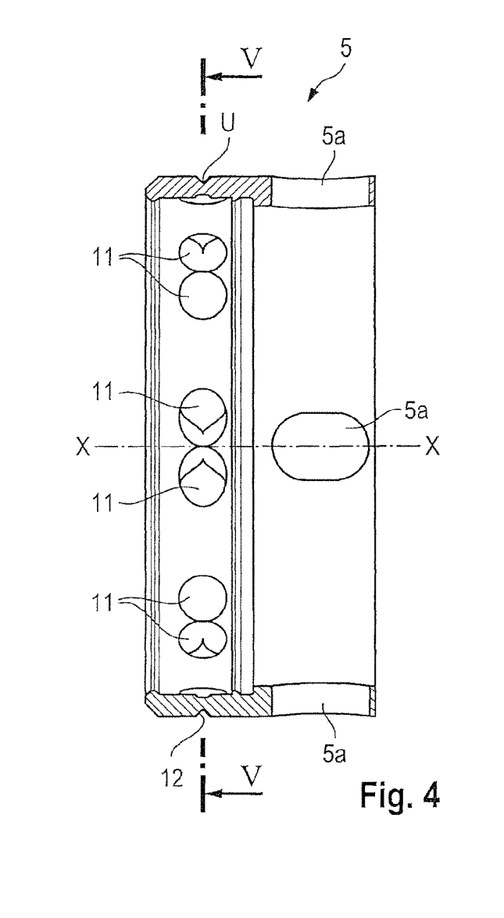
FIG. 4 is a schematic sectional view of the carrier ring of FIG. 3.
Figure 5:
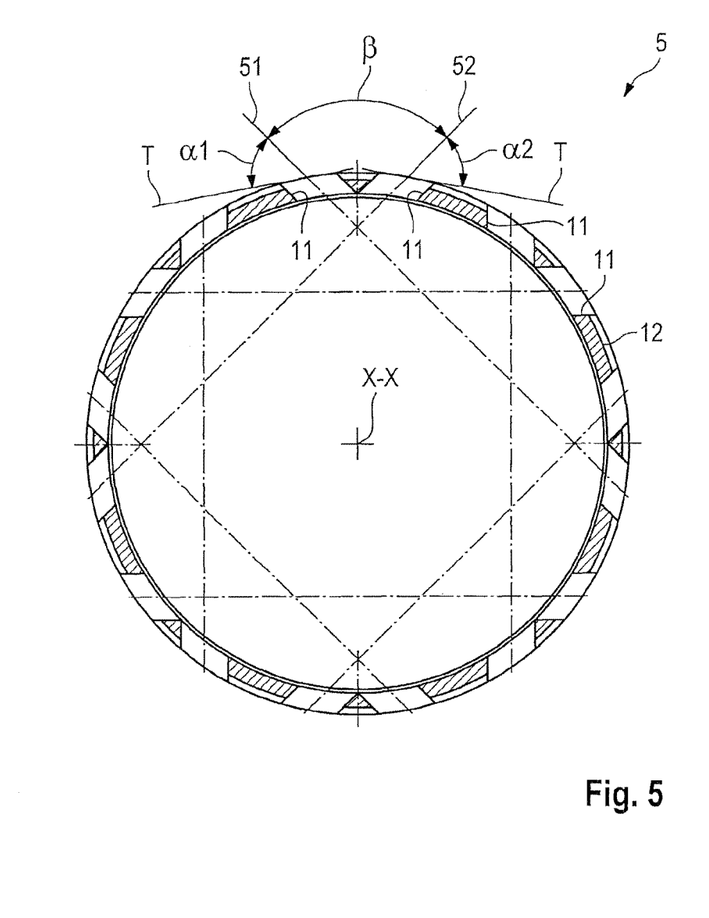
FIG. 5 is a schematic sectional view of the carrier ring along line V-V of FIG. 4.
Figure 6:
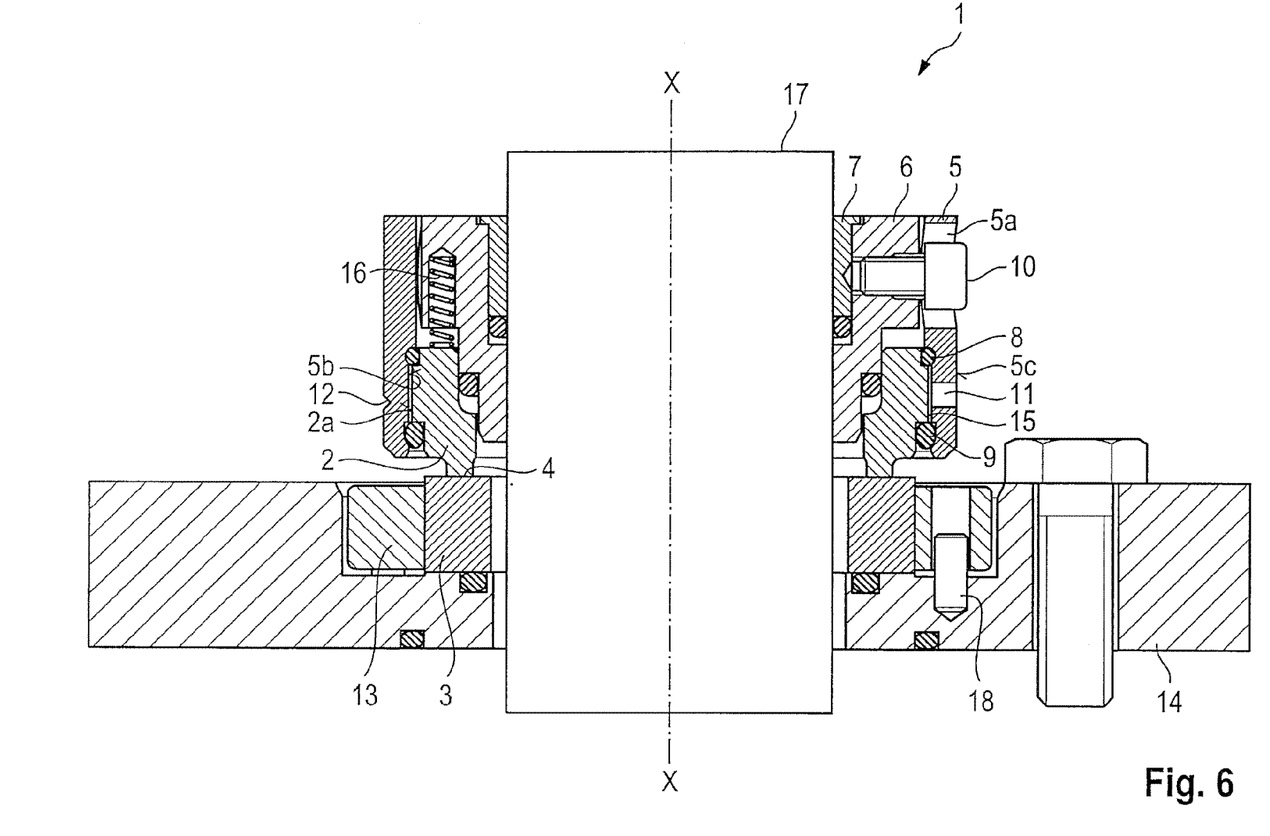
FIG. 6 is a schematic sectional view of the mechanical seal assembly.

As can particularly be seen in FIG. 5, the carrier ring 5 of this embodiment comprises a total of sixteen connecting openings 11. The connecting openings 11 are here provided as cylindrical bores the centers of which are respectively arranged on a common circumferential line U in a plane on the carrier ring. Furthermore, a surrounding groove 12 which in this embodiment is V-shaped with an angle of about 90° is formed on this circumferential line U on the outer circumference of the carrier ring 5. As can particularly be seen in FIG. 4, the connecting openings 11 are arranged such that respective pairs of connecting openings 11 are provided closely adjacent to each other. The connecting openings 11 are here provided such that they respectively form an angle of less than 90° with a tangent T to the central axis 51, 52. In this embodiment in FIG. 5 two angles of two neighboring connecting openings 11 are drawn by way of example, wherein in the first connecting opening 11 the angle is α1 and in the second connecting opening 11 the angle is α2. Here, the angles have the same size, but different signs. Furthermore, the respectively directly neighboring connecting openings 11 are installed such that a central axis 51 of one of the connecting openings is provided at an angle β of about 90° relative to a central axis 52 of the neighboring connecting opening 11.

This pairwise arrangement of the connecting openings 11 in mutually opposite directions on the carrier ring 5 has the great advantage that this achieves a cooling of the rotating seal ring 2 independent of the rotation direction by fluid flowing into and out of the connecting openings 11. In other words, the rotation direction of the mechanical seal assembly can now be chosen at will, with the same cooling effect being achieved all the time.

The connecting openings 11 have the effect that upon rotation of the carrier ring 5 fluid can flow through the connecting openings 11 into the interspace 15, can absorb heat in the interspace from the rotating seal ring 2 and can be transported away via other connecting openings 11 from the interspace 15. Since normally with increasing rotational speeds more heat is generated in the area of the sealing gap 4 between the two seal rings, it is possible owing to the air flow of the invention through the connecting openings 11 and the interspace 15 to provide a cooling power which is equally increased with increasing rotational speeds. Furthermore, a pressure compensation, particularly a venting, of the interspace between the rotating seal ring 2 and the carrier ring 5 can be rendered possible through the connecting openings 11. Hence, no pressure can build up in the interspace 15 between the two O-rings 8, 9, so that there is no risk that the rotating seal ring 2 shows a tendency towards distortions due to such a pressure, which would significantly reduce the service life of the mechanical seal assembly. Furthermore, leakage due to distortions of the seal rings can be avoided.

The groove 12 which is formed on the outer circumference of the carrier ring 5 effects a guidance of the fluid and leads to an improved inflow of the fluid into the connecting openings 11 and to an improved outflow, respectively, out of the connecting openings 11.

Hence, the invention provides an improved cooling of the rotating seal ring 2, whereby wear on the mechanical seal is reduced and the service life is prolonged. Furthermore, losses in the friction power and in a drive are also reduced thereby. Furthermore, e.g. service intervals for the seal rings can thereby be extended, and the mechanical seal assembly of the invention can be used while satisfying increased demands made on product temperature and rotational speeds.

The rotating seal ring 2, the carrier ring 5, the shaft bush 6, the clamping ring 7, the first O-ring 8 and the second O-ring 9 form a subassembly which can be preassembled and which can be held together by the fastening elements 10.

Furthermore, it should be noted that the connecting openings 11 may be configured to be not only cylindrical, but also with varying diameters and/or in a tapering form. Moreover, any desired number can be chosen for the connecting openings 11. Furthermore, it is possible to form the connecting openings 11 also as elongated holes, whereby a further improved cooling can be achieved.

Figure 7:
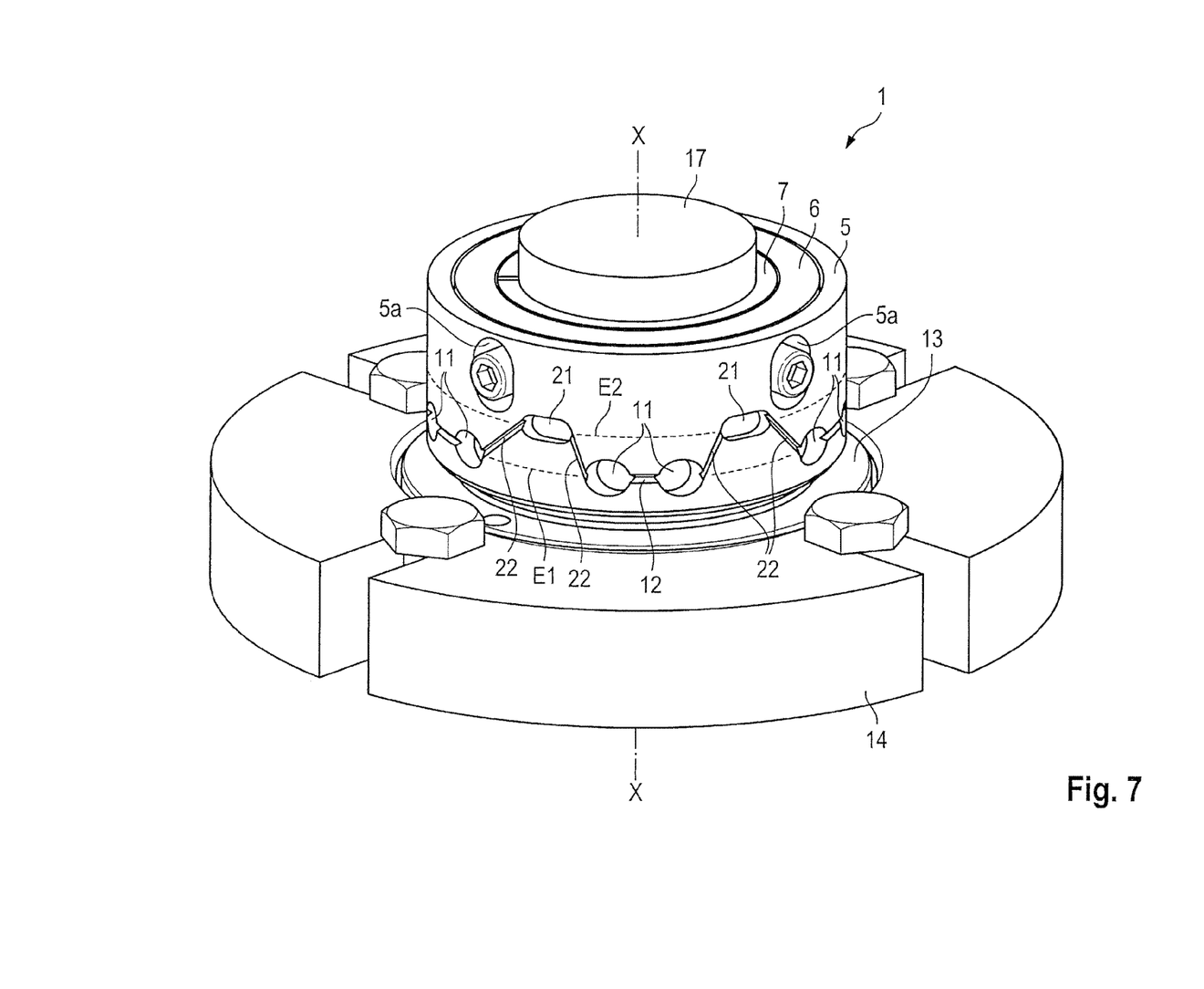
FIG. 7 is a schematic perspective view of a mechanical seal assembly according to a second embodiment of the invention.

A mechanical seal assembly 1 according to a second embodiment shall now be described hereinafter with reference to FIG. 7, wherein like or functionally like parts are designated with the same reference numerals as in the first embodiment.

In contrast to the first embodiment, the connecting openings 11 are arranged in the second embodiment on a first plane E1, and further connecting openings 21 are arranged on a second plane E1. The two planes E1, E2 are here in parallel with each other and perpendicular to the central axis X-X of the mechanical seal assembly 1. Furthermore, connecting grooves 22 are provided that connect connecting openings 11 of the first plane E1 to connecting openings of the second plane E2, which are formed as elongated holes 21. This has the effect that the mechanical seal assembly is cooled at various places. It should be noted that as an alternative it is also possible to provide the connecting openings on more than two planes and to interconnect the same via grooves in a corresponding way. Hence, according to the invention and in response to the respective application an individual cooling of the mechanical seal assembly can be made possible.

Otherwise, this embodiment conforms to the preceding embodiment, so that reference is made to the description given there.

The mechanical seal assembly 1 according to the invention is preferably used in a vertical orientation of the shaft 17, particularly in agitators, or the like.

LIST OF REFERNCE NUMERALS

1 Mechanical seal assembly
2 Rotating seal ring
3 Stationary seal ring
4 Sealing gap
5 Carrier ring
5a Fastening openings
5b Inner circumferential surface
5c Outer circumferential surface
6 Shaft bush
7 Clamping ring
8 First O-ring
9 Second O-ring
10 Fastening element
11 Connecting opening
12 Groove
13 Retaining ring
14 Flange
15 Interspace
16 Biasing means
17 Shaft
18 Headless screw
21 Elongated hole
22 Groove
51 Central axis
52 Central axis
E1, E2 Plane
T Tangent

The invention claimed is:

1. A mechanical seal assembly, comprising: a rotating seal ring and a stationary seal ring, which define a sealing gap therein between wherein the rotating seal ring is free of holes; a shaft bush, on which the rotating seal ring is arranged; a carrier ring having at least one connecting opening, wherein the carrier ring is arranged on the shaft bush and at least partly covers the rotating seal ring on the outer circumference thereof; a first O-ring and a second O-ring, which are arranged between the rotating seal ring and the carrier ring and define an interspace on the outer circumference of the rotating seal ring between the carrier ring and the rotating seal ring; and the at least one connecting opening connects the interspace to an outer circumferential surface of the carrier ring.

2. The assembly according to claim 1, wherein multiple connecting openings are provided.

3. The assembly according to claim 2, wherein the connecting openings are arranged along the circumference of the carrier ring on a joint circular line, or that the connecting openings are arranged in different planes on the carrier ring.

4. The assembly according to claim 1, wherein the connecting openings are configured to be cylindrical with identical or different diameters, and/or tapering, particularly conically tapering and/or stepped and/or as elongated holes.

5. The assembly according to claim 1, wherein a central axis of the connecting openings is arranged at an angle ($\alpha 1$, $\alpha 2$) of less than 90°, particularly between 45° and 65°, and preferably about 55°, relative to a tangent T on the outer circumference of the carrier ring.

6. The assembly according to claim 5, wherein the central axes of two neighboring connecting openings define an angle $\beta$ of about 90°.

7. The assembly according to claim 6, wherein two neighboring connecting openings intersect each other on an inner circumferential surface of the carrier ring.

8. The assembly according to claim 1, further comprising a groove which is provided on an outer circumferential surface of the carrier ring and connects the connecting openings on the outer circumferential surface of the carrier ring.

9. The assembly according to claim 1, further comprising a clamping ring which is radially arranged within the shaft bush.

10. The assembly according to claim 1 the carrier ring in axial direction (X-X) is longer than the shaft bush.

11. The assembly according to claim 1, wherein the rotating seal ring, the shaft bush, the carrier ring and the first and second O-ring form a subassembly which can be pre-assembled.

12. A method for using the mechanical seal assembly of claim 1.

* * * * *